United States Patent [19]

Elbel et al.

[11] 3,982,359

[45] Sept. 28, 1976

[54] ABRASIVE MEMBER OF BONDED AGGREGATES IN AN ELASTOMERIC MATRIX

[75] Inventors: Karl Elbel; Kurt Wolfinger, both of Pforzheim, Germany

[73] Assignee: ROC A.G., Zug, Switzerland

[22] Filed: June 10, 1975

[21] Appl. No.: 585,465

Related U.S. Application Data

[63] Continuation-in-part of Ser. No. 416,830, Nov. 19, 1973, abandoned, which is a continuation of Ser. No. 88,981, Nov. 12, 1970, abandoned, which is a continuation-in-part of Ser. No. 834,885, June 19, 1969, abandoned.

[30] Foreign Application Priority Data

June 21, 1968 Germany............................ 1752612

[52] U.S. Cl.............................. 51/295; 51/298 R; 51/299 R
[51] Int. Cl.²........................ B24D 3/22; B24D 3/28

[58] Field of Search...................... 51/295, 298, 299

[56] References Cited

UNITED STATES PATENTS

| | | | |
|---|---|---|---|
| 2,194,472 | 3/1940 | Jackson | 51/299 |
| 2,216,728 | 10/1940 | Benner et al. | 51/298 |
| 3,048,482 | 8/1962 | Hurst | 51/298 |

*Primary Examiner*—Donald J. Arnold
*Attorney, Agent, or Firm*—Hans Berman; Kurt Kelman

[57] ABSTRACT

Abrasive grains rigidly bonded to each other form aggregates which are dispersed in a resilient matrix of an abrasive wheel so that the aggregates do not significantly interfere with each other's individual movement under grinding stresses against the resilient restraint of the matrix. The wheels remove metal from a workpiece much faster and lose less abrasive material than corresponding wheels in which the same abrasive particles are individually embedded in the same matrix.

9 Claims, No Drawings

ABRASIVE MEMBER OF BONDED AGGREGATES IN AN ELASTOMERIC MATRIX

This application is a continuation-in-part of application Ser. No. 416,830, filed Nov. 19, 1973, and now abandoned, which is a continuation of abandoned application Ser. No. 88,981, filed Nov. 12, 1970, the last-mentioned application being a continuation-in-part of the abandoned application Ser. No. 834,885, filed June 19, 1969.

This invention relates to abrasives, and particularly to solid abrasive members in which grains of abrasive material are embedded in a continuous matrix lacking significant abrasive properties.

This invention will be described hereinafter with specific reference to grinding wheels, but it is equally applicable to sharpening stones and other abrasive members having a planar working face.

Abrasive wheels are commonly classified according to the bond employed for connecting the abrasive particles. The bond may be rigid as in vitrified, silicate, resinoid, shellac, and oxychloride wheels each of which has found specific fields of application. It is a common feature of rigidly bonded wheels that they cannot adapt themselves to the contour of a workpiece. Rubber-bonded wheels have been used on a limited scale where adaptability of the wheel to specific contours is needed, but they remove metal from a workpiece at a very slow rate and are better suited for polishing than for grinding. The rate of metal removal by a rubber-bonded wheel can be increased by increasing the ratio of abrasive grains to bond or by reducing the resiliency of the bond, but the basic advantages of a rubber-bonded wheel are lost thereby to a substantial extent.

Rigidly bonded abrasive wheels are prepared from intimate, pulverulent mixtures of abrasive grains, bonding agent, fillers and adjuvants. It is of the utmost importance that the individual abrasive grains be uniformly dispersed in the matrix-forming ingredients. Any accumulation or aggregation of abrasive particles would act like a single, large abrasive grain and produce deep scratches in the treated metal surface.

It has now been found that rubber wheels and similarly bonded wheels having aggregated abrasive particles have none of the disadvantages of corresponding, rigidly bonded abrasive wheels, and that wheels having aggregates of abrasive particles rigidly bonded to each other and spacedly dispersed in a matrix of rubber or like elastomeric material have properties not jointly available heretofore. They have the flexibility and resiliency characteristic of their matrix while being capable of removing metal and other hard material from a workpiece at a rate not heretofore possible with flexible wheels. The finish produced on treated metal is closely similar to that expected from the grit size of the individual abrasive grains in the aggregates, and is afected only to a minor extent by the size of the aggregates.

An essential condition for this mode of operation is the spacing of the aggregates from each other. They must be capable of yielding to the pressure exerted by the workpiece in a manner controlled by the resilient restraint of the matrix. Direct contact between aggregates in the relaxed condition of the matrix is to be avoided substantially completely, and each aggregate must be capable of moving from its position in the relaxed matrix without significant interference from adjacent other aggregates.

Taking into consideration the specific gravity of corundum (abt. 4) or silicon carbide (abt. 3), the most common abrasives in practical use at this time, and the specific gravity of natural and synthetic rubbers, elastomeric polyurethanes, elastomeric, plasticized polyvinyl chloride, and of other synthetic elastomers (abt. 1 – 2) which are the preferred matrix base materials of this invention, the weight ratio between abrasive aggregates and matrix in the abrasive members of this invention should be between 1:0.5 and 1:1.25. For a rigid intra-aggregate bond, all the common bonding agents conventionally employed in rigid grinding wheels are suited, and the individual abrasive grains in the aggregates may thus be bonded to each other by a wide range of materials, including but not limited to, the glasses commonly used in vitrified wheels and the phenolic resins used in most resinoid bonded wheels, the weight ratio of abrasive grains and intra-aggregate bonding agent being between 20:1 and 3:1. It is important that the hardness of the aggregates, as measured on the durometer in Shore units, be much greater than that of the matrix. Generally, best results are achieved if the matrix has a hardness of Shore A 75 to 20, while the aggregates have a hardness of at least Shore D 65.

For an equal weight ratio of abrasive material to matrix, the grinding wheels of the invention are more flexible and adaptable and remove more metal from a workpiece than conventional rubber-bonded wheels in which the individual abrasive grains are uniformly distributed in the matrix.

It is a known shortcoming of conventional rubber-bonded wheels that individual abrasive grains are only weakly retained by the elastomeric matrix. The aggregates of the invention have a much rougher surface than individual grains because of the practically random arrangement of the grains in the aggregates. This observed fact is believed to account for the better retention of the aggregates by an elastomeric matrix.

The optimum size and shape of the individual aggregates depends somewhat on the dimensions of the abrasive wheel or other abrasive member. In wheels having a diameter up to 200 mm, the aggregates preferably have a diameter of 2 mm to 6 mm, and may be of similar length or longer. In wheels up to 400 mm diameter, aggregates of 4 to 10 mm diameter have been used to advantage. A diameter of at least 4 mm is preferred. The aggregates may have a shape approaching that of a sphere or cube, or they may be elongated. Approximately cylindrical rods have been found to be manufactured conveniently at low cost, and to be as fully effective as any other shape tested so far.

The aggregates may and should contain the usual adjuvants which improve performance when incorporated in rigidly bonded wheels. Such adjuvants include pyrite, kryolith, potassium fluoborate, and may be present in the matrix as well as in the aggregates.

The abbrasive bodies of the invention are employed to advantage where abrasive-loaded felt wheels, lamellar wheels, and abrasive belts were used heretofore. They are equally suited for dry and wet grinding and their performance is more uniform and more predictable for this reason than that of the last-mentioned abrasive members.

The following Examples are further illustrative of this invention. All parts and percentage values are by weight unless specifically stated otherwise.

EXAMPLE 1

An abrasive mixture was prepared from the following ingredients:

| | |
|---|---|
| Corundum (96% $Al_2O_3$, 120 grit) | 72.8 parts |
| Pyrite, finely ground | 16.7 parts |
| Bakelite 2224 | 3.0 parts |
| Bakelite 433 | 7.5 parts |

Bakelite 2224 is a novolak-type phenol formaldehyde resin containing about 8.2% hexamethylenetetramine and about 4% polyvinyl butyral. Bakelite 433 is a phenol-formaldehyde resin of the resol type.

Rod-shaped aggregates approximately 10 mm long and 3 mm in dia. were formed from the mixture in a compression mold and cured at elevated temperature. The cured abrasive rods had a hardness greater than Shore D 85.

3000 Parts of the aggregates were dispersed in a matrix composition obtained by intimately mixing the following ingredients:

| | |
|---|---|
| Thiokol LP 2 | 1000 parts |
| Regal R | 300 parts |
| GMF | 22 parts |
| Sulfur | 2 parts |
| Vulkacit D | 10 parts |
| Barolub LAK | 150 parts |
| Calcicoll | 50 parts |
| Zinc yellow 1007 | 100 parts |
| Bakelite 435 | 75 parts |

Thiokol LP 2 is a liquid, sulfur-bearing organic material made from chlorinated hydrocarbon and sodium polysulfide which forms an elastomer when vulcanized. Regal R is a semi-reinforcing furnace black. Vulkacit D is s-diphenylguanidine. GMF is p-hydroquinone dioxime. Barolub is an ethylenediamine distearate. Zinc yellow 1007 is a zinc chromate pigment. Calcicoll is precipitated calcium carbonate. Bakelite 435 is a phenolformaldehyde resin of the resol type which improves adhesion of cured Thiokol LP 2 on corundum. The components of the matrix composition are commonly employed in the formulation of abrasive wheels and were chosen for their known effects in amounts corresponding to best commercial practice.

The matrix mixture having the abrasive agregates dispersed therein was tampered into a mold whose cavity defined a cylindrical disc 250 mm in diameter, having an axial width of 50 mm and a central, axial bore 35 mm in diameter. The mold was held at 90°C for 14 hours to cure its contents.

There was obtained an abrasive disc or wheel in which the aggregates of corundum composition were spacedly embedded in a resilient matrix having a Shore hardness of A 65 – 70. The disc will be referred to hereinbelow as Disc A.

EXAMPLE 2

The procedure described in Example 1 was repeated employing abrasive aggregates which were rods approximately 20 mm long and 6 mm in diameter, having the same composition as the aggregates used in Example 1, and having a hardness of more than 85 on the Shore D scale. The hardness of the cured matrix was Shore A 60 - 65. The product obtained after curing will be referred to as Disc B.

EXAMPLE 3

A matrix mixture was prepared from

| | |
|---|---|
| Rhenophen E 135 | 2000 parts |
| Rhenopur E 200 | 2500 parts |
| Rhenosorb - T - Paste | 150 parts |
| DABCO 33 LV | 11 parts |

Rhenophen E 135 and Rhenopur E 200 jointly form a two-component mixture which is converted to an elastomeric polyurethane resin upon curing. Rhenosorb-T-Paste is a 50% dispersion of a molecular sieve of the sodium aluminum silicate type in castor oil (Rhein-Chemie), DABCO 33 LV is an amine type accelerator (Houdry-Huls GmbH).

Corundum aggregates of the same composition and the same dimensions as in Disc B were dispersed in the matrix mixture in an amount of 4600 parts, and a mold dimensioned as in Example 1 was charged with the liquid product so obtained. An exothermic reaction started at once and was completed after about two hours, whereupon an abrasive wheel was removed from the mold. The cured matrix had a hardness of Shore A 43 - 48.

The disc so prepared will be referred to hereinafter as Disc C.

EXAMPLE 4

Rod-shaped aggregates of the composition indicated in Example 1 were prepared to a length of approximately 10 mm and a diameter of about 3 mm. The aggregates were crushed between the platens of a laboratory press, and the comminuted material was fractionated by screening. A fraction consisting of particles having approximate dimensions of 2.5 mm in all three directions was selected for preparing Disc D by a procedure identical with that of Example 1 except for the particle size of the abrasive aggregates. Because of the small dimensions of the aggregates and their close spacing in the elastomeric matrix, neither the hardness of the aggregrates nor that of the matrix could be determined, but it must be assumed that the hardness values were not significantly different from those of Disc A.

EXAMPLE 5

The abrasive wheels prepared in Examples 1 to 4 were tested on a carefully maintained laboratory grinder whose shaft rotated at 1550 r.p.m., resulting in a surface speed of approximately 20 m/min. for the tested wheels. The workpiece employed in each of the tests was steel stock (German Standard Type ST 37 k) 80 mm × 750 mm × 15 mm whose dry major surface was fed tangentially to the rotating wheel at 4 m/min. The direction of movement of the workpiece was reversed cyclically after one meter, and the wheel was lifted automatically as it approached an end of the workpiece from either direction. The workpiece was ground over its entire length. A contact pressure of 15 kg was maintained between the wheel and the workpiece for a pressure of 3 kg per centimeter wheel width. To avoid overheating of the workpiece, it was replaced by a new workpiece after 50 cycles of reciprocating movement, that is, after wheel travel of 75 m over the workpiece. Four workpieces were ground on each wheel, corresponding to a grinding time of 75 minutes.

The tested wheels and the workpieces were weighed to the nearest 500 mg before each test and after 50 cycles of reciprocating workpiece movement. The surface roughness of each tested workpiece transverse to the grinding direction was determined at the end of each test on a testing apparatus of type Mitutoyo Surftest No. 178 – 903.

Table I lists the Shore hardness of the matrix, the greatest surface roughness measured in the ground steel rods, the combined weight loss of the four steel rods ground on the same wheel, the simultaneous weight loss of the wheel, and the quotient Q arrived at by dividing the square of the steel weight loss by the weight loss of the wheel, a commonly used numerical expression of the efficiency of a grinding wheel.

TABLE I

| Disc | Hardness | Roughness m μm | Steel loss,q | Wheel loss,q | Q |
|------|----------|----------------|--------------|--------------|------|
| A | A65/70 | 3.0 | 327 | 14 | 7640 |
| B | A60/65 | 5.5 | 578 | 24 | 13930 |
| C | A43/48 | 8.4 | 966 | 118 | 7921 |
| D | (A65/70) | 3.7 | 218 | 15 | 2261 |

As is evident from the Table, effectiveness of the tested wheels is closely associated under otherwise equal conditions with the size of the aggregates used, being highest for Disc B whose aggregates had dimensions of 20 mm × 6 mm, and lowest for Disc D whose aggregates had approximately uniform dimensions of 2.5 mm. The intermediate value for Disc A was obtained with aggregates having intermediate dimensions of 10 mm × 3 mm.

Although the aggregates in Disc C had the same dimensions as in Disc B, the grinding effectiveness of the disc was only slightly better than that of Disc A due to the lower hardness of the matrix.

The roughness of the steel ground with Discs A, B, and D is related to the dimensions of the aggregates, but also to their shape, the elongated rods in Discs A and B producing somewhat smoother surfaces than the approximately isotropic aggregates of Disc D for corresponding dimensions. The aggregates more loosely bonded in the softer matrix of Disc C produce the roughest ground surfaces.

EXAMPLE 6

For comparison purposes, the test procedure of Example 5 was applied to otherwise similar grinding wheels which lacked the aggregates of abrasive grains and/or the elastomeric matrix characteristic of the abrasive wheels of the invention.

Disc E was a grinding wheel of Type A-120-Q-B (120 grit corundum in a hard phenolic resin bond) purchased from the manufacturer who reported that it consisted of 84% corundum (abt. 96% $Al_2O_3$), 13% phenolic resin, and 3% filler. Its hardness was greater than Shore D 85.

Disc F contained the same abrasive aggregates, 20 mm × 6 mm, as Discs B and C in the following composition:

| Aggregates | 33.0 parts |
|---|---|
| Epoxy resin 0164 AS | 10.0 parts |
| Durcal 130 | 15.0 parts |
| Epoxide hardener 91 | 2.6 parts |

Durcal 130 is ground, natural, crystalline limestone, Epoxy resin 0164 AS is a commercial diene epoxide having an epoxy value of 0.53 – 0.54, and a viscosity of 950 – 1050 centipoises. Hardener 91 is a liquid amine hardener of 48 g equivalents having a density of 1.04 g/ml and a viscosity of 200 – 300 cp. The cured matrix had a Shore D hardness greater than 90.

Disc G differed from Disc A in containing an equal weight of 120 grit corundum instead of aggregates in an elastomeric Thiokol matrix and had a Shore A hardness of 78 – 80.

Disc H contained 120 grit corundum grains in an elastomeric polyurethane matrix and was prepared from the following ingredients in the same manner as Disc C:

| Rhenophen E 123 | 3600 parts |
|---|---|
| Rhenosorb - T - Paste | 100 parts |
| Rheno-Rapid A 101 | 12 parts |
| Rhenodur C 110 | 1217 parts |
| Corundum | 7920 parts |

Rhenophen E 123 is a colorless polyether-glycol mixture free from fillers and has a viscosity of about 800 cp at 25°C and a hydroxyl number of about 80. Rheno-Rapid A 101 is a very fluid tertiary amine accelerator. Rhenodur C 110 is a liquid, almost colorless isocyanate having a CNO content of about 23% and a viscosity of about 700 cp at 25°C.

The ingredients were mixed intimately, and the mixture was poured immediately into a mold dimensioned as in Example 1. Curing was complete after two hours at ambient temperature. The Disc H so obtained had a Shore A hardness of 55 – 60.

Table II lists the results of grinding tests performed on Discs E to H.

TABLE II

| Disc | Hardness | Roughness m μm | Steel loss,g | Wheel loss,g | Q |
|------|----------|----------------|--------------|--------------|------|
| E | D85+ | 9.0 | 1107 | 1093 | 1118 |
| F | D90+ | 7.2 | 250 | 60 | 1050 |
| G | A78/80 | 2.8 | 33 | 18 | 60 |
| H | A55/60 | 3.6 | 160 | 34 | 752 |

The Discs E and F having a hard, resinoid matrix had better Q values than the Discs G and H in which an elastomeric matrix was employed. Only minor differences in Q value were found between Disc E in which the abrasive corundum particles were individually embedded in a phenolic matrix and Disc F in which aggregates of corundum particles were spacedly dispersed in a rigid epoxy resin matrix. The aggregates in Disc F were held tighter than the individual grains in Disc E, but removed only a very small amount of metal from the workpieces. The resilient Discs G and H essentially produced a polishing action with minimal removal of metal by the individual grains of corundum. The surface finish produced by the two rigid Discs E and F was similar and much rougher than that of workpieces ground by means of the elastomeric wheels. As in the tests summarized in Table I, a harder elastomeric matrix produced a smoother finish than a softer matrix.

All Q values in Table II are lower than those in Table I, and the differences between the individual Discs A – D of the invention and between the individual Discs E – H are only minor as compared to the overall differences between the two groups. Clearly, the specific chemical nature of the principal elastomeric constituent in the matrix is immaterial as is the size of the abrasive aggregates employed when compared with the differences between abrasive wheels having aggregates spacedly distributed in an elastomeric matrix and abrasive wheels lacking either an elastomeric matrix or abrasive grains rigidly bonded to each other in spaced aggregates.

These findings have been confirmed by tests of wheels using other elastomeric matrix compositions based on butadiene copolymers, with acrylonitrile and/or styrene, chlorobutadiene polymers, polyvinyl acetal, isoprene-isobutylene copolymers, and silicone rubbers. As an abrasive material, there may be used silicon carbide instead of corundum grains, and abrasive grains of different grit sizes from coarse size 10 to classified 600 grit flours. The changes in results produced by these variables are of a quantitative nature and predictable, but do not affect the results brought about by the combination of rigidly bonded aggregates and elastomeric matrix materials.

However, aggregates made from abrasives coarser than 20 grit offer smaller advantages over individually embedded grains than do aggregates made from finer abrasives, best results being generally obtained by sizes between 40 and 400 grit.

While this invention has found its most important application in abrasive wheels in which the circumference of the wheel moves rapidly relative to a flat or contoured surface of a workpiece, shaped abrasive members of the invention may assume shapes which lack the axial symmetry of a disc or wheel. The wheels of the invention may be flat, recessed, cup-shaped, and the like as is known in itself.

It should be understood, therefore, that the foregoing disclosure relates only to preferred embodiments, and that it is intended to cover all changes and modifications in the examples of the invention herein chosen for the purpose of the disclosure which do not constitute departures from the spirit and scope of the invention set forth in the appended claims.

What is claimed is:

1. A shaped, flexible, resilient abrasive member essentially consisting of a matrix of elastomeric material and a plurality of aggregates embedded in said matrix in spaced relationship and bonded to each other by said material, each aggregate essentially consisting of a multiplicity of grains of abrasive material and of a bonding agent more rigid than said elastomeric material and bonding said grains to each other, said matrix having a Shore A hardness of 75 to 20, and said aggregates having a Shore D hardness of at least 65.

2. A member as set forth in claim 1, wherein the size of each aggregate is between 2 mm and 10 mm.

3. A member as set forth in claim 2, wherein said size is at least 4 mm.

4. A member as set forth in claim 2, wherein said member is an abrasive wheel.

5. A member as set forth in claim 4, wherein the weight ratio of said matrix to said aggregates is between 0.5:1 and 1.25:1.

6. A member as set forth in claim 5, wherein the weight ratio of said grains to said bonding agent in said aggregates is between 20:1 and 3:1.

7. A member as set forth in claim 2, wherein said elastomeric material essentially consists of a synthetic rubber.

8. A member as set forth in claim 7, wherein said bonding agent essentially consists of a phenol-formaldehyde resin.

9. A member as set forth in claim 2, wherein the size of said grains is not greater than 20 grit.

* * * * *